United States Patent [19]

Day

[11] Patent Number: 4,770,741
[45] Date of Patent: Sep. 13, 1988

[54] ACCESSORY FOR A TIRE TREAD BUILDER

[75] Inventor: Keith A. Day, Pietermaritzburg, South Africa

[73] Assignee: Day Holdings (Proprietary) Ltd., Pietermaritzburg, South Africa

[21] Appl. No.: 906,554

[22] Filed: Sep. 5, 1986

Related U.S. Application Data

[63] Continuation of Ser. No. 673,831, Nov. 21, 1984, abandoned.

[30] Foreign Application Priority Data

Nov. 22, 1983 [ZA] South Africa ................ 83/8717

[51] Int. Cl.$^4$ ............................................. B29D 30/62
[52] U.S. Cl. ....................................... 156/909; 425/17; 425/209
[58] Field of Search ................ 156/909, 95, 96, 128.1, 156/127, 130; 425/17, 131.1, 209; 264/37, 36; 198/533, 536, 558, 671, 550.1; 222/238

[56] References Cited

U.S. PATENT DOCUMENTS

| 742,591 | 10/1903 | Clark | 222/238 |
| 2,772,764 | 12/1956 | McClellan | 198/671 |
| 3,308,000 | 3/1967 | Holman | 156/397 |
| 3,366,368 | 1/1968 | Hibbing | 425/209 X |
| 3,797,702 | 3/1974 | Robertson | 198/548 |
| 3,879,150 | 4/1975 | Brown et al. | 222/238 |
| 4,139,309 | 2/1979 | Billingsley | 264/37 X |
| 4,426,018 | 1/1984 | Ward | 198/558 |

FOREIGN PATENT DOCUMENTS

| 2838110 | 3/1980 | Fed. Rep. of Germany | 425/131.1 |
| 53-138483 | 12/1978 | Japan | 264/37 |

Primary Examiner—Michael W. Ball
Assistant Examiner—Ramon R. Hoch
Attorney, Agent, or Firm—Bernard, Rothwell & Brown

[57] ABSTRACT

The invention relates to an accessory for an "orbitread" tread builder, or the like, whereby waste rubber crumbs or buffing dust can be used for the formation of a tread strip to be applied onto a tire casing to form a new tread layer. The accessory essentially includes a feeding arrangement to feed the crumbs or dust into the screw or worm conveyor of the tread builder, where it is combined with the conventionally used rubber compound which is extruded into the required tread strip form.

9 Claims, 3 Drawing Sheets

ACCESSORY FOR A TIRE TREAD BUILDER

This is a continuation of application Ser. No. 673,831, filed Nov. 21, 1984, now abandoned.

FIELD OF THE INVENTION

This invention relates to an accessory for a tire tread builder. More particularly, the invention relates to an accessory for a tire tread builder of a type known in the trade as an "orbitread" builder, or any like tread builder which has a screw or worm conveyor, or the like, to extrude a rubber compound for forming a tread strip.

BACKGROUND TO THE INVENTION

Orbitread builders, and other tread builders of a similar type, utilise an elongate, continuous strip of a suitable rubber compound which is extruded into a suitable tread strip form in which it can be applied onto an existing buffed tire, to be retreaded, in a continuous manner to form the new tread area of the tire. After such application, special tread formations can be formed in the tread rubber and the retreading can then be completed by curing the newly applied tread, whereby its required wear qualities are attained.

Generally, with tread builders of the above type, the original strip of a suitable rubber compound is fed into a screw or worm conveyor which conveys the compound towards an extrusion die through which it is forced to form the strip or tread to be applied onto a tire. The operation of such tread builders, hereinafter merely referred to as "tread builders", is not described in any further detail herein since it does not form an essential part of the present invention.

It is known to the Applicants that one major waste product resulting from the retreading of tires is rubber dust or crumbs. Such dust or crumbs in particular result from the buffing of tires before a new tread layer is applied, in order to form a suitable surface for receiving such a tread layer. Rubber dust or crumbs can clearly also be provided as a result of other processes which relate particularly to the tire industry, or the like. Usually such dust or crumbs go to waste but as it is often of a suitable rubber compound used for tires, attempts have been made to employ such dust or crumbs for forming a tread strip which can be utilised to form the new tread layer of a tire during retreading.

One particular method of utilising rubber dust or crumbs in the above manner has been to provide a feeding device, which can cooperate with tread builders, to feed rubber dust or crumbs into the screw or form conveyor of the tread builders, so that it is combined with the conventionally used strip of a suitable rubber compound to be extruded into a tread strip form, as above described. One proposed feeding device for the above purpose includes a box-like feed hopper for containing the rubber dust or crumbs and a screw conveyor disposed beneath an opening in the hopper to convey rubber dust or crumbs to an outlet from which it can be fed into the screw conveyor of the tread builder.

Because of the tendency of rubber dust or crumbs to adhere together and compact, no success has been attained in providing a continuous feed of rubber dust or crumbs to the tread builder, despite the use of a conventional type agitator, located in the hopper, taking the form of a rotatable shaft having rubber fingers projecting therefrom to continuously agitate the rubber dust or crumbs. For the above reasons and to the knowledge of the Applicants, the proposed use of rubber dust or crumbs has never been commercially accepted and suitable feeding devices have never been perfected and sold.

SUMMARY OF THE INVENTION

In the light of the above it is an object of this invention to provide an accessory for a tread builder whereby rubber dust or crumbs can be effectively and continuously fed into the screw conveyor of a tread builder.

It is further an object of the invention to provide a hopper for an accessory of the above kind from which rubber dust or crumbs can be continuously fed to the screw conveyor of the tread builder and to provide an agitator for use in the hopper to enhance the required continuous feed of the rubber dust.

According to the invention there is provided an accessory for a tread builder, which includes a hopper, for containing rubber crumbs or dust, which has slanting walls that converge towards an elongate passage-like formation at its operative lower end and defines an outlet opening at one end of the passage-like formation;

a screw conveyor rotatably mounted within the passage-like formation for conveying rubber crumbs or dust from the hopper out the outlet opening;

an agitator comprising an elongate shaft having a plurality of rigid agitator members projecting therefrom, the shaft being rotatably mounted within the hopper operatively above the passage-like formation; and means to rotate the screw conveyor and the shaft of the agitator.

The agitator members may be rigid fingers or paddles projecting substantially radially from the shaft of the agitator, the length of the fingers or paddles being determined by the location of the shaft of the agitator above the passage-like formation and the walls of the hopper, which must be cleared by the said fingers or paddles.

The means to rotate the screw conveyor and the agitator may include connector means such as pulleys and belts whereby the screw conveyor and the agitator can be effectively connected to a drive means. The drive means may be a separate electric motor, or the like. Alternatively, the drive means may be a suitable member of a tread builder, together with which the accessory of the invention can be used, which rotates during the ordinary mode of operation of the tread builder. More particularly, the drive means may effectively be the screw or worm conveyor of the tread builder which may be engageable by means of a suitable split pulley, or the like.

By utilising an arrangement as above-defined, it will be appreciated that the rate of rotation of the screw conveyor of the accessory can be easily controlled and determined by varying the diametrical dimensions of the respective pulleys used.

In use, the hopper of the accessory of the invention is filled with reclaim crumbs or buffing dust which is fed from the hopper via the outlet opening as a result of rotation of the screw conveyor. As the screw conveyor rotates in response to the operation of the tread builder, it will be appreciated that a supply of rubber compound is simultaneously fed into the tread builder and, in particular, into the screw or worm conveyor of the builder which conveys it to an extrusion die through which it is forced by the screw or worm conveyor to provide a suitable strip or tread width which can be applied onto a tire. The rubber crumbs or buffing dust fed from the hopper is also guide towards the screw or worm conveyor of the tread builder where it is effectively mixed with the raw material of the continuous supply so that it forms a part of the strip or tread width extruded from the extrusion die.

The accessory of the invention may thus include a guide means for guiding reclaim rubber crumbs or buffing dust from the hopper towards a passage within which the screw or worm conveyor of the tread builder is rotatable. The guide means may be any conduit such as a flexible rubber conduit, a metal conduit, or the like through which reclaim rubber crumb or buffing dust can fall under gravity from the hopper into the said passage within which the screw or worm conveyor of the tread builder is rotatable. As such it will be appreciated that the hopper of the accessory should be mountable above the said passage or at any other suitable location with respect to the passage.

The accessory of the invention may conveniently include suitable mounting means for mounting the accessory onto a tread builder in a required position.

The proposed positioning of the accessory of the invention with respect to a tread builder must clearly also be determined by the proposed connection between a rotating part of the tread builder and the screw conveyor and agitator of the accessory, which must be rendered rotatable, in use. The rate at which rubber crumbs or buffing dust are fed into the above passage in which the screw or worm conveyor of a tread builder is rotatable may clearly be controlled in response to the rate of rotation of the screw or worm conveyor of the builder and by the suitable pre-selection of pulley sizes, any required rate of feed can be provided for. Preferably, the rate of feed of rubber crumbs or buffing dust should be such that the crumbs or dust form between five and twenty percent of the extruded rubber material applied onto a tire. Preferably, the rubber crumbs or buffing dust should form approximately ten percent of the material applied onto a tire.

The size of the crumbs or dust may be variable but should be sufficiently small not to affect the required properties of the raw rubber material applied onto a tire. Preferably, the size of the crumbs or dust should be such that it can pass through a 30 mesh screen, or even smaller.

By permitting the use of reclaim rubber crumbs or buffing dust in a treading process, it becomes possible to effectively utilise waste rubber which is commonly created in the rubber industry and, in particular, in the retreading industry where tires to be retreaded are pre-buffed before the application of a new retread tread. Whereas this material would otherwise have had to be dumped or re-processed it now forms a significant part of the new material forming the new retread tread of a tire and significant cost savings can thereby result.

The invention is now described, by way of an example, with reference to the accompanying diagrammatic drawings, in which.

Figure 1:
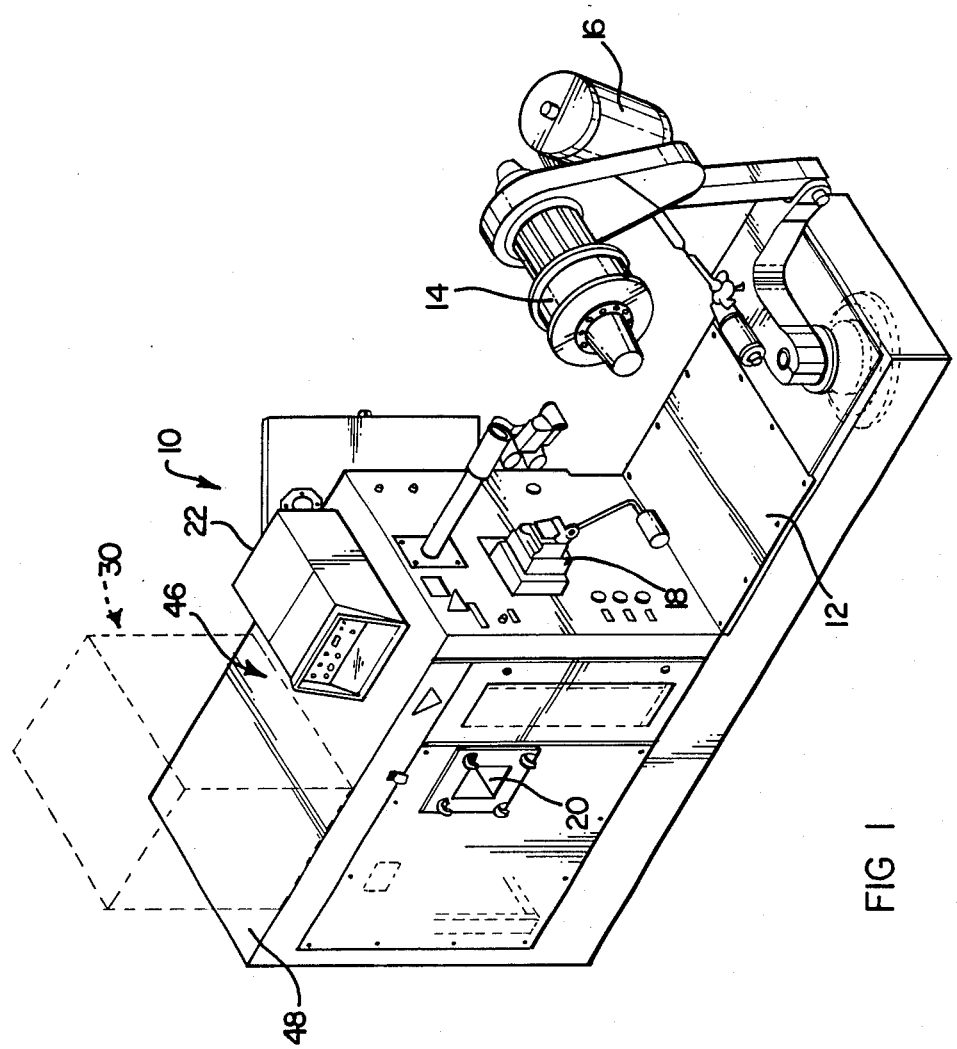
FIG. 1 shows a three-dimensional view of an orbitread tread builder.
Figures 2, 3:
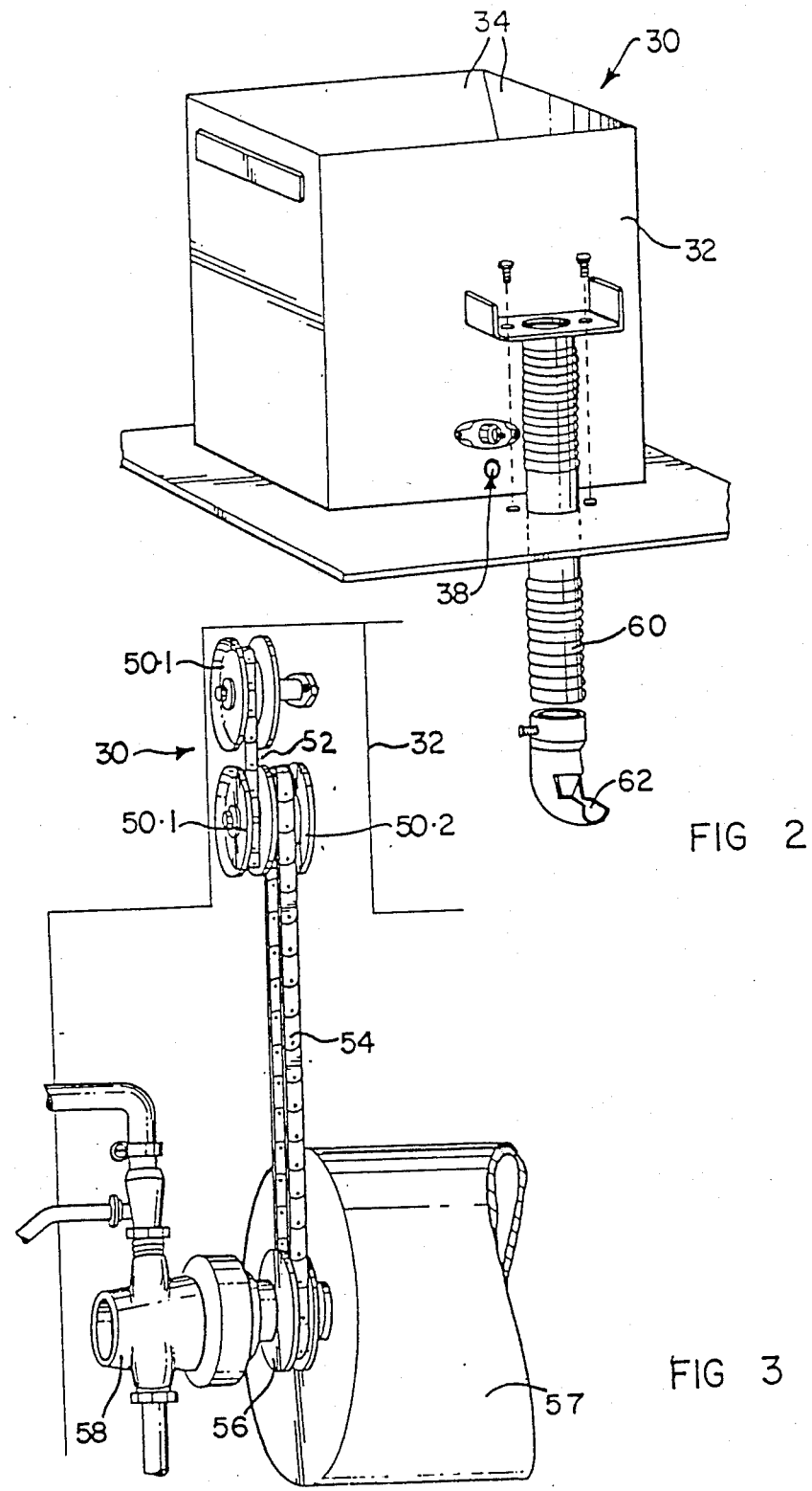
FIG. 2 shows a three-dimensional view of an accessory for a tread builder, in accordance with the invention.
FIG. 3 shows a drive arrangement for the accessory of FIG. 2.

Referring initially to FIG. 1 of the drawings, an orbitread tread builder is generally indicated by the reference numeral 10.

The builder 10 includes a base 12 onto which a hub 14 is mounted in a manner to be adjustably positionable and onto which a tire to be retreaded can be located. An electric motor 16 is provided to rotate the hub 14 in use of the builder 10 to provide for rotation of a tire located on the hub 14.

The builder 10 further includes an extrusion die 18 which is in communication with a passage (not shown) within which a screw or worm conveyor (not shown) is rotatable. A feed passage 20 is in communication with the passage within which the screw or worm conveyor is rotatable and permits an elongate continuous mastication of a suitable raw rubber compound to be fed towards the screw or worm conveyor which deforms and conveys the continuous mastication towards the extrusion die 18 through which the mastication is forced to form a strip suitable for application onto a tire to be retreaded to form the new tread area of the tire. A control box 22 includes suitable control mechanisms whereby the extrusion of the rubber strip from the extrusion die 18 is controlled.

The actual operation of the orbitread builder 10 during building of a tire is not described in detail herein since it is well known to those skilled in the art and does not form an essential part of the present invention.

Referring now also to FIGS. 2 to 5 of the drawings, an accessory for a tread builder, in accordance with the invention, is generally indicated by the reference numeral 30. The accessory 30 includes a hopper 32 which includes slanted walls 34 which converge towards an elongate passage-like formation 36 defined at the operative lower end of the hopper 32. An outlet opening 38 is defined at one end of the passage-like formation 36 and a screw or worm conveyor 40, hereinafter merely referred to as a screw conveyor, is mounted for rotation within the passage-like formation 36 whereby a suitable material as hereinafter defined can be displaced from the hopper 30 via the outlet opening 38.

Immediately above the screw conveyor 40 an agitator, comprising an elongate shaft 42 and a number of agitator members 44, is rotatably mounted. The members 44, which may be fingers 44.1 or paddles 44.2 or a combination thereof, are of a rigid material such as a metal material. At least one of the agitator members is located in the central region of the elongate shaft 42. The exact mode of rotational mounting of the screw conveyor 40 and the agitator can clearly be accomplished in various ways and is thus not shown and described in detail herein, save as to say that the screw conveyor is mounted in a manner that eliminates completely any possible radial movement thereof. Suitable bearings may be used for this purpose as well as a locating pin, fixed with respect to the hopper, which axially engages the screw conveyor 40 via the opening 38 (this pin is not shown for the sake of clarity in FIGS. 2 and 5).

The accessory 30 is mountable onto a body portion 46 of the builder 10 in a position as shown in dotted lines in FIG. 1. Suitable mounting means may be provided for this purpose, the mounting means being particularly adapted to cooperate with existing formations on the body portion 46 of the builder 10 to facilitate such mounting. In particular, the wall 48 of the body portion 46 is removed and the accessory 30 is then bolted onto the body portion 46 utilising the apertures which are defined for the location of the wall 48.

In order to provide for rotation of the screw conveyor 40 and the agitator shaft 42 of the accessory 30, pulleys 50 are mounted onto the ends of the screw conveyor 40 and shaft 42 projecting from the hopper 32 as shown. The pulleys 50.1 are operatively connected by a first infinite belt 52 whereas the pulley 50.2 is operatively connected during installation of the accessory 30 by means of a second infinite belt 54 onto a special pulley 56 which is effectively mounted onto the screw or worm conveyor of the builder retreader 10 where it projects from a gear box 57 through which the screw or worm conveyor is driven. The region shown where the pulley 56 is securely located is a free region available for this purpose on the builder 10 and by utilising a split pulley no disassembly of the builder 10 is therefore required. On the conventional orbitread builder 10 as shown, this region, which effectively extends from the screw or worm conveyor of the builder l0, is connected to a water pump 58 which provides cooling water to the builder 10 in order to prevent overheating thereof in use.

As mentioned above, the rate of rotation of the screw or worm conveyor of the builder is controllable and since it is directly connected to the screw conveyor 40 of the accessory 30 the rate of rotation of the screw conveyor 40 is also controllable. By the use of pulleys having preselected diametrical dimensions the exact rate of rotation of the screw conveyor 40 with respect to the screw or worm conveyor of the orbitread builder can thus be pre-selected for purposes hereinafter described.

Figure 4:
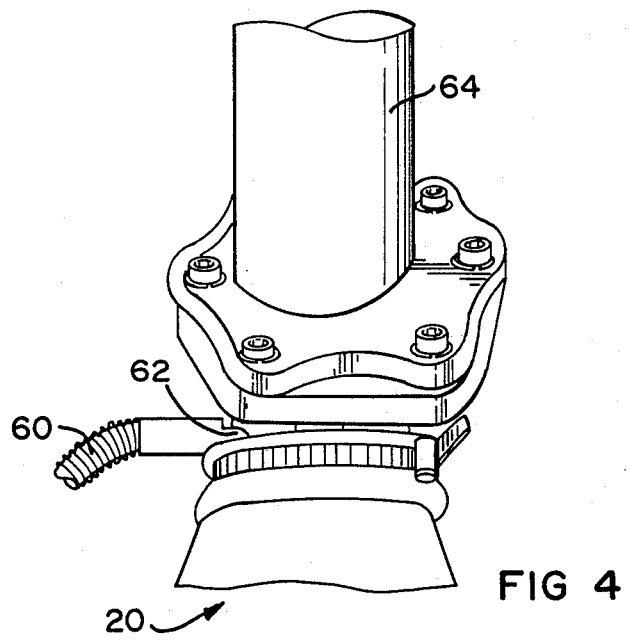
FIG. 4 shows a portion of the orbitread builder of FIG. 1 having a conduit of the accessory of FIG. 2 connected thereto.
Figure 5:
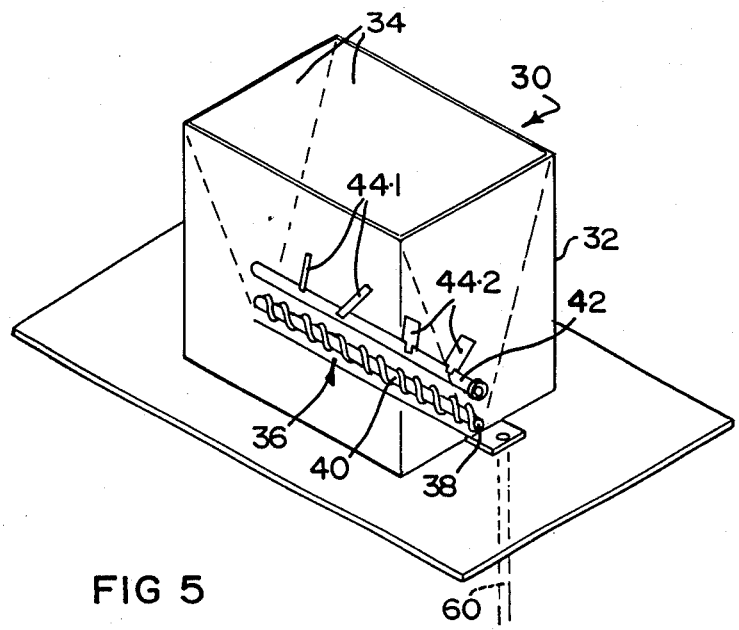
FIG. 5 shows a schematic three-dimensional view of the accessory of FIG. 2.

The accessory 30 is particularly adapted to feed reclaim rubber crumbs or buffing dust from the hopper 32 towards the screw or worm conveyor of the builder 10. Such crumbs or dust which is fed through the outlet opening 38 is guided towards the passage within which the screw or worm conveyor of the builder is rotatable by means of a suitable guide means in the form of a flexible conduit 60, the conduit 60 defining an open end immediately beneath the outlet opening 38 so that any crumb or dust passing through this opening 30 will fall, under gravity, into the conduit 60 through which it will pass towards an outlet formation 62 as shown. The outlet formation 62 is suitably connected to be in communication with the passage within which the screw or worm conveyor of the builder is rotatable in the manner as shown in FIG. 4 and this exact mode of attachment is clearly determined by the particular configuration of the builder 10. This is thus also not described in any further detail herein except insofar as to say that the outlet formation 62 may be specifically adapted for use in conjunction with different types of tread builders.

Referring specifically to FIG. 4, the passage within which the screw or worm conveyor of the builder is rotatable comprises a tubular member 64 which is in communication with the feed passage 20 utilising a suitable rubber seal as is shown clearly in FIG. 4. It will thus be appreciated that as a continuous supply of a suitable raw rubber compound is fed towards the screw or worm conveyor of the tread builder any reclaim rubber crumbs or buffing dust passing through the conduit 60 will be effectively mixed therewith to thereby form a part of the rubber strip or tread extruded from the extrusion die 18 which is then applied onto a tire to form a tread. The percentage contents of such reclaim rubber crumbs or dust may be between 5 and 20% of the total content of the rubber strip or tread being extruded and is preferably approximately 10%. The control of this percentage is clearly determined by the rate of rotation of the screw conveyor 40 of the accessory 30 and being responsive to the screw or worm feed of the builder 10, this can thus remain constant.

As reclaim rubber crumbs or buffing dust have a tendency to adhere or compact together the slanting walls and the agitator enhances the even feed of the crumbs or dust towards the screw conveyor 40. By providing rigid fingers or paddles 44 which rotate within the lower region of the hopper 32 the rubber crumbs or dust within the hopper 32 is effectively broken up and thrown over by the fingers or paddles 44, during their rotation and this further enhances a consistent feed to the screw conveyor 40. By providing a plurality of rigid fingers or paddles 44 on the shaft 42 of the agitator it is ensured that at least one of these fingers or paddles is effective. The length of the fingers or paddles 44 is clearly determined by the location of the shaft 42 on which they are mounted, their length being such that they just clear the slanting walls 34 of the hopper 32 during rotation of the shaft 42. The spacing of the shaft 42 above the passage-like formation 36 is such that sufficient rubber crumbs or dust above the passage-like formation 36 is agitated to prevent such crumbs or dust to adhere or compact together and thereby inhibit the feed thereof to the formation 36. The secure location of the screw conveyor 40 also enhances the continuous feed of the crumbs or dust from the hopper since radial movement of the conveyor 40 could encourage compacting within the passage-like formation 36.

It will be appreciated that reclaim rubber crumbs or dust can be obtained from any waste rubber which is generally available within retreading, new tire or rubber factories. In particular, such dust or crumbs is obtained during buffing of tires prior to retreading thereof and if not used as above-described would have to be discarded or re-processed. Crumbs or dust obtained from such buffing is particularly suitable since such rubber already includes all the required qualities of a tread rubber compound to be used for a tire tread. If crumbs or dust is used which does not have these properties, its contents may clearly have to be reduced within the final strip or tread which is applied onto a new tire or tire to be retreaded. By the use of this effective waste material, significant cost savings can clearly be provided for as the use of "new" material is clearly reduced.

It must be appreciated that an accessory of the invention can be provided for use in conjunction with any tread builder of the type using a screw or worm conveyor, also sometimes referred to as an arbor, or the like, whereby a rubber raw material is extruded via a suitable extrusion die to form a rubber strip or tread. As such, the accessory can be used in conjunction with the formation of a tread layer on new tires or "retread" tires by means of a tread builder of the above type. The accessory may clearly require adaptations for different type tread builders and can also be used together with any other apparatus for extruding rubber in the above manner for whatever purpose.

I claim:

1. A tread builder comprising:
   an extrusion die through which a suitable rubber compound provided in strip form can be forced for forming a tread strip layer which can be applied onto the outer surface of a buffed tire to form the new tread area of the tire;
   an extrusion screw for conveying the rubber compound in strip form towards the extrusion die and forcing it through the die;
   drive means to drive the extrusion screw;
   a hopper, for containing rubber crumbs or dust, which has slanting walls that converge towards the lower end of the hopper to define an elongate passage-like formation at the lower end of the hopper, said hopper having an outlet opening at one end of the passage-like formation;
   a screw conveyor rotatably mounted within the passage-like formation for conveying rubber crumbs or dust from the hopper out the outlet opening;
   guide means for guiding rubber crumbs or dust from the outlet opening at one end of the passage-like formation to the extrusion screw;
   an agitator comprising an elongated shaft having a plurality of rigid agitator members projecting substantially radially therefrom and wherein at least one said agitator member is located in the central region of said elongated shaft, the shaft being rotatably mounted with the hopper operatively above the passage-like formation; and
   means for mechanically connecting the screw conveyor and the shaft of the agitator to said drive means to rotate the screw conveyor and agitator in response to rotation of said extrusion screw by said drive means;
   said means for mechanically connecting the screw conveyor and the shaft of the agitator to said drive means including pulleys which are secured to ends of the screw conveyor and the shaft which project from the hopper, the pulleys being connectable by suitable drive belts to said drive means.

2. A tread builder as claimed in claim 1, in which said agitator members are rigid fingers projecting substantially radially from said shaft of the agitator.

3. A tread builder as claimed in claim 1, in which said agitator members are rigid paddles projecting substantially radially from said shaft of the agitator.

4. A tread builder as claimed in claim 1, in which the length of said agitator members are determined by the location of said shaft of the agitator above said passage-like formation and said walls of the hopper, the length of the members being such that they marginally clear said walls during rotation of said shaft of the agitator.

5. A tread builder as claimed in claim 1, in which said drive means is a direct or indirect extension of said screw or worm conveyor of the tread builder onto which a pulley can be mounted.

6. A tread builder as claimed in claim 1, in which the guide means is a conduit through which the rubber crumbs or dust can fall freely under gravity.

7. A tread builder as claimed in claim 6, in which the conduit is a flexible conduit.

8. In combination with a tread builder wherein said tread builder includes an extrusion die through which a suitable rubber compound provided in strip form can be forced for forming a treat strip layer which can be applied onto the outer surface of a buffed tire to form the new tread area of the tire, an extrusion screw for conveying the rubber compound in strip form towards the extrusion die and forcing it through the die, and drive means to drive the screw or worm conveyor; an accessory comprising
   a hopper, for containing rubber crumbs or dust, which has slanting walls that converge towards the lower end of the hopper to define an elongate passage-like formation at the lower end of the hopper, said hopper having an outlet opening at one end of the passage-like formation;
   a screw conveyor rotatably mounted within the passage-like formation for conveying rubber crumbs or dust from the hopper out the outlet opening;
   guide means for guiding rubber crumbs or dust from the outlet opening at one end of the passage-like formation to the extrusion screw of the tread builder;
   an agitator comprising an elongated shaft having a plurality of rigid agitator members projecting substantially radially therefrom and wherein at least one said agitator member is located in the central region of said elongated shaft, the shaft being rotatably mounted within the hopper operatively above the passage-like formation; and
   means for mechanically connecting the screw conveyor and the shaft of the agitator to the drive means of the tread builder to rotate the screw conveyor and agitator in response to rotation of the extrusion screw of the tread builder by the said drive means;
   said means for mechanically connecting the screw conveyor and the shaft of the agitator to the drive means of the tread builder including pulleys which are secured to ends of the screw conveyor and the shaft which project from the hopper, the pulleys being connectable by suitable drive belts to said drive means.

9. An accessory as claimed in claim 8, which includes mounting means for mounting the accessory onto the tread builder in a required position.

* * * * *